United States Patent
Gonzalez et al.

(10) Patent No.: US 8,683,082 B2
(45) Date of Patent: *Mar. 25, 2014

(54) REMOVABLE MEMORY DEVICES FOR DISPLAYING ADVERTISEMENT CONTENT ON HOST SYSTEMS USING APPLICATIONS LAUNCHED FROM REMOVABLE MEMORY DEVICES

(75) Inventors: Carlos J. Gonzalez, Los Gatos, CA (US); Edwin J Cuellar, San Jose, CA (US); Susan A. Cannon, Santa Cruz, CA (US)

(73) Assignee: Sandisk Technologies Inc., Plano, TX (US)

( * ) Notice: Subject to any disclaimer, the term of this patent is extended or adjusted under 35 U.S.C. 154(b) by 1270 days.

This patent is subject to a terminal disclaimer.

(21) Appl. No.: 11/314,844

(22) Filed: Dec. 21, 2005

(65) Prior Publication Data
US 2007/0130521 A1    Jun. 7, 2007

Related U.S. Application Data

(60) Provisional application No. 60/736,336, filed on Nov. 14, 2005.

(51) Int. Cl.
*G06F 3/00* (2006.01)
*G06Q 30/00* (2012.01)

(52) U.S. Cl.
USPC ............................................. 710/1; 705/14.1

(58) Field of Classification Search
USPC ....................................... 710/1; 705/14, 14.1
See application file for complete search history.

(56) References Cited

U.S. PATENT DOCUMENTS

| | | |
|---|---|---|
| 5,570,315 A | 10/1996 | Tanaka et al. |
| 5,774,397 A | 6/1998 | Endoh et al. |
| 6,046,935 A | 4/2000 | Takeuchi et al. |
| 6,314,451 B1 | 11/2001 | Landsman et al. |
| 6,317,791 B1 | 11/2001 | Cohn et al. |
| 6,373,746 B1 | 4/2002 | Takeuchi et al. |
| 6,456,528 B1 | 9/2002 | Chen |
| 6,463,468 B1 * | 10/2002 | Buch et al. ............... 709/219 |

(Continued)

FOREIGN PATENT DOCUMENTS

WO     WO 03/081446 A1     10/2003

OTHER PUBLICATIONS

Non-Final Office Action on co-pending (U.S. Appl. No. 11/313,568) dated Jan. 28, 2008.
Official Action for U.S. Appl. No. 11/313,568 (May 21, 2008).

(Continued)

*Primary Examiner* — Chun-Kuan Lee
(74) *Attorney, Agent, or Firm* — Jenkins, Wilson, Taylor & Hunt, P.A.

(57) ABSTRACT

A removable memory device is provided. The device includes a plurality of re-programmable non-volatile memory cells; and a controller including a processor and a controller memory, wherein an application is launched from the removable memory device and executed on a host system when the removable memory device interfaces with the host system, and the application launches a display window on a display device, wherein the display window is controlled by the application and is used to display advertisement content that is stored in the plurality of memory cells or from a server that is accessible by the host system.

1 Claim, 7 Drawing Sheets

(56) References Cited

U.S. PATENT DOCUMENTS

| | | | |
|---|---|---|---|
| 6,522,580 B2 | 2/2003 | Chen et al. | |
| 6,643,188 B2 | 11/2003 | Tanaka et al. | |
| 6,771,536 B2 | 8/2004 | Li et al. | |
| 6,781,877 B2 | 8/2004 | Cernea et al. | |
| 2001/0013131 A1* | 8/2001 | Wang | 725/100 |
| 2002/0094870 A1 | 7/2002 | Murray | |
| 2002/0133402 A1 | 9/2002 | Faber et al. | |
| 2002/0147638 A1* | 10/2002 | Banerjee et al. | 705/14 |
| 2004/0078385 A1* | 4/2004 | Yamada | 707/102 |
| 2005/0177419 A1 | 8/2005 | Choi et al. | |
| 2005/0192867 A1 | 9/2005 | Haitsuka et al. | |
| 2007/0112625 A1 | 5/2007 | Gonzalez et al. | |

OTHER PUBLICATIONS

Official Action and Interview Summary for U.S. Appl. No. 11/313,568 (May 19, 2009).

Notice of Non-Compliant Appeal Brief for U.S. Appl. No. 11/313,568 (Feb. 25, 2009).

Notice of Non-Compliant Appeal Brief for U.S. Appl. No. 11/313,568 (Jan. 12, 2009).

Final Official Action for U.S. Appl. No. 11/313,568 (Nov. 27, 2009).

"Web Content Accessibility Guidelines 1.0," W3C Consortium, Version 1 (Copyright 1999).

Notice of Panel Decision from Pre-Appeal Brief Review for U.S. Appl. No. 11/313,568 (May 11, 2010).

Advisory Action for U.S. Appl. No. 11/313,568 (Mar. 17, 2010).

* cited by examiner

REMOVABLE MEMORY DEVICES FOR DISPLAYING ADVERTISEMENT CONTENT ON HOST SYSTEMS USING APPLICATIONS LAUNCHED FROM REMOVABLE MEMORY DEVICES

CROSS REFERENCE TO RELATED APPLICATION

The present application claims priority under 35 USC §119(e) to the following provisional patent application, the disclosure of which is incorporated herein by reference in its entirety:

Ser. No. 60/736,336, filed on Nov. 14, 2005, entitled "SYSTEM AND METHOD FOR DISPLAYING ADVERTISEMENT USING FLASH MEMORY STORAGE DEVICES" with Carlos J. Gonzalez, Edwin J. Cuellar and Susan A. Cannon as inventors.

The present application is also related to patent application Ser. No. 11/314,844, entitled "SYSTEM AND METHOD FOR DISPLAYING ADVERTISEMENT USING FLASH MEMORY STORAGE DEVICES" filed on even date herewith, the disclosure of which is incorporated herein by reference in its entirety.

BACKGROUND OF THE INVENTION

1. Field of the Invention

The present invention relates to computing systems, and more particularly, to displaying advertisements using a flash memory storage device.

2. Background

Electronic commerce is becoming commonplace with the rapid increase in the use of the Internet. Consumers continue to spend more time with computing devices for personal and business needs. The Internet today is a significant portal for advertisers who want to expose their goods and services to consumers.

Advertisers continue to push advertisements and promotional materials/information (jointly referred to as "Ads" or "Ad content") to consumers in various ways, for example, web sites that provide some service to consumers are typically funded via advertisements to the consumer. Examples include web sites that provide "search" services on the Internet like Google®, Yahoo®, or shopping services like Amazon®, and eBay®, or other services like free email accounts, maps, etc.

Ads are displayed on a user's computer when a user visits a website or clicks on a website link, or when the and the website presents sponsored links in addition to the results from that search.

Efficient business organizations continue to explore different avenues by which Ads and information regarding their goods and services can reach consumers. There is a need for novel techniques by which organizations can get their Ads displayed to consumers.

SUMMARY OF THE INVENTION

In one aspect of the present invention, a removable memory device is provided. The device includes a plurality of re-programmable non-volatile memory cells; and a controller including a processor and a controller memory, wherein an application is launched from the removable memory device and executed on a host system when the removable memory device interfaces with the host system, and the application launches a display window on a display device, wherein the display window is controlled by the application and is used to display advertisement content that is stored in the plurality of memory cells or from a server that is accessible by the host system.

In another aspect of the present invention the removable memory device includes a plurality of re-programmable non-volatile memory cells; and a controller including a processor and a controller memory, wherein an application stored in the non-volatile memory cells is launched from the removable memory device and executed on a host system, and the application launches a display window on a display device, wherein the display window is controlled by the application; and the application facilitates a secured connection between a server and the memory device so that advertisement content can be updated and displayed in real time on a display device.

In yet another aspect of the present invention, a system for displaying advertisement content on a display device is provided. The system includes, a host system that interfaces with a removable memory device; and a server that can update an application and/or advertisement content stored in a plurality of memory cells of the removable memory cells; wherein the application is launched from the removable memory device and executed on the host system when the removable memory device interfaces with the host system, and the application launches a display window on a display device, wherein the display window is controlled by the application and is used to display the advertisement content in real time from the server when a network connection with the server is active.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

In one aspect of the present invention, a removable, non-volatile, memory device (may also be referred to as "flash device" or "flash memory device") is provided that stores an Advertising Client application (ACA) and Ad content. The ACA and/or Ad content can be stored in a secured area of the flash device and/or encrypted. The flash device stores advertising content that can only be accessed/changed/updated after proper authentication.

The ACA is preferably launched from the flash device either when the device interfaces, with a host system or as a result of user activity. The ACA launches an Ad window (or POP-Up Ads) where Ad content is showed to the user.

To facilitate an understanding of the preferred embodiment, the general architecture and operation of a computing system/non-volatile memory storage device will first be described. The specific architecture and operation of the preferred embodiment will then be described with reference to the general architecture.

Computing System/Flash Device

Figure 1A:
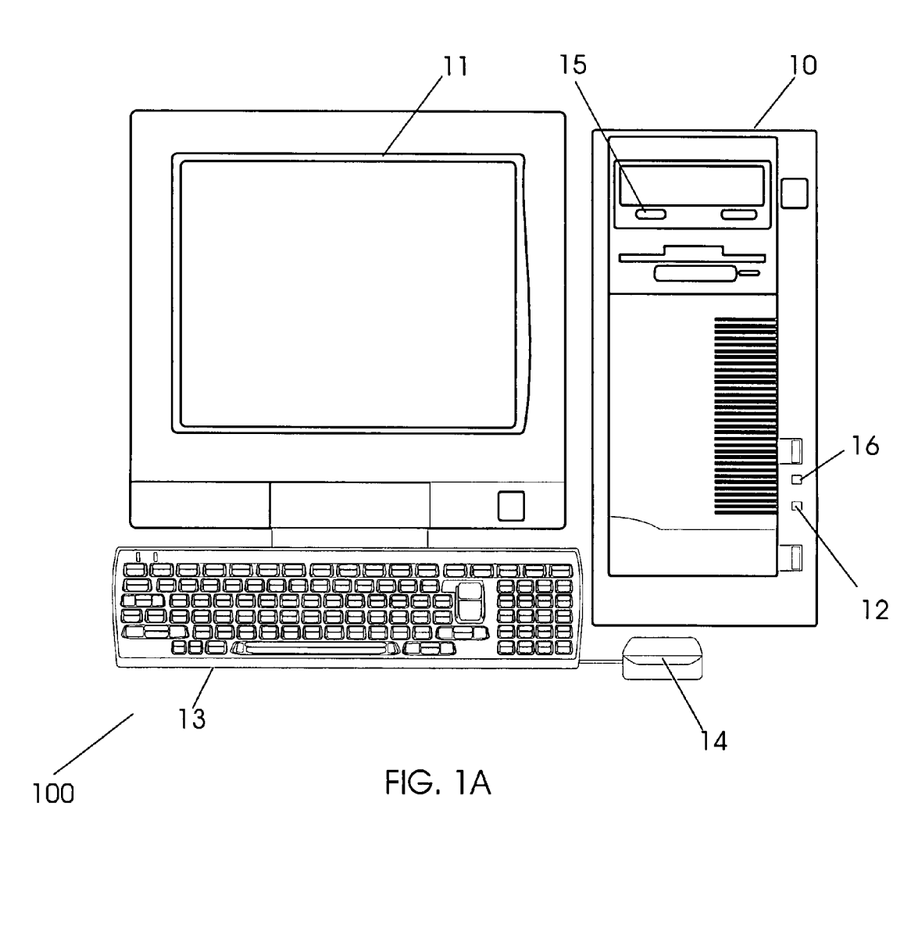
FIG. 1A shows a block diagram of a computing system, according to one aspect of the present invention.

FIG. 1A is a block diagram of a computing system 100 used according to various adaptive aspects of the present invention. System 100 includes a computer 10 (may also be referred to as "host system 10") and a monitor 11. Monitor 11 may be a cathode ray tube (CRT) type, a liquid crystal display (LCD) type, or any other type of color or monochrome display. Also provided with computer 10 are a keyboard 13 for entering data and user commands, and a pointing device (for example, a mouse) 14 for processing objects displayed on monitor 11.

Computer 10 includes a computer-readable memory medium such as a hard disk 15 for storing readable data. Besides other programs, disk 15 can store application programs including web browsers by which computer 10 connects to the Internet.

According to one aspect of the present invention, computer 10 can also access a computer-readable, non-volatile memory device (for example, a removable, flash memory device) that stores data files, Ad content, application program files (for example, the ACA), and computer executable process steps embodying the present invention or the like, via a flash memory receptacle/interface 16. A CD-ROM, or CD R/W (read/write) interface (not shown) may also be provided with computer 10 to access application program files, audio files and data files stored on a CD-ROM.

A modem, an integrated services digital network (ISDN) connection, or the like also provides computer 10 with a network (for example, the Internet) connection 12. The network connection 12 allows computer 10 to download data files, audio files, movies, video, application program files and conduct on-line E-commerce transactions.

It is noteworthy that the present invention is not limited to the FIG. 1A architecture. For example, notebook or laptop computers, handheld devices (including without limitation, personal digital assistants (PDAs) cell phones, and other common host platforms), set-top boxes or any other system capable of running computer-executable process steps, as described below, may be used to implement the various aspects of the present invention.

Figure 1B:
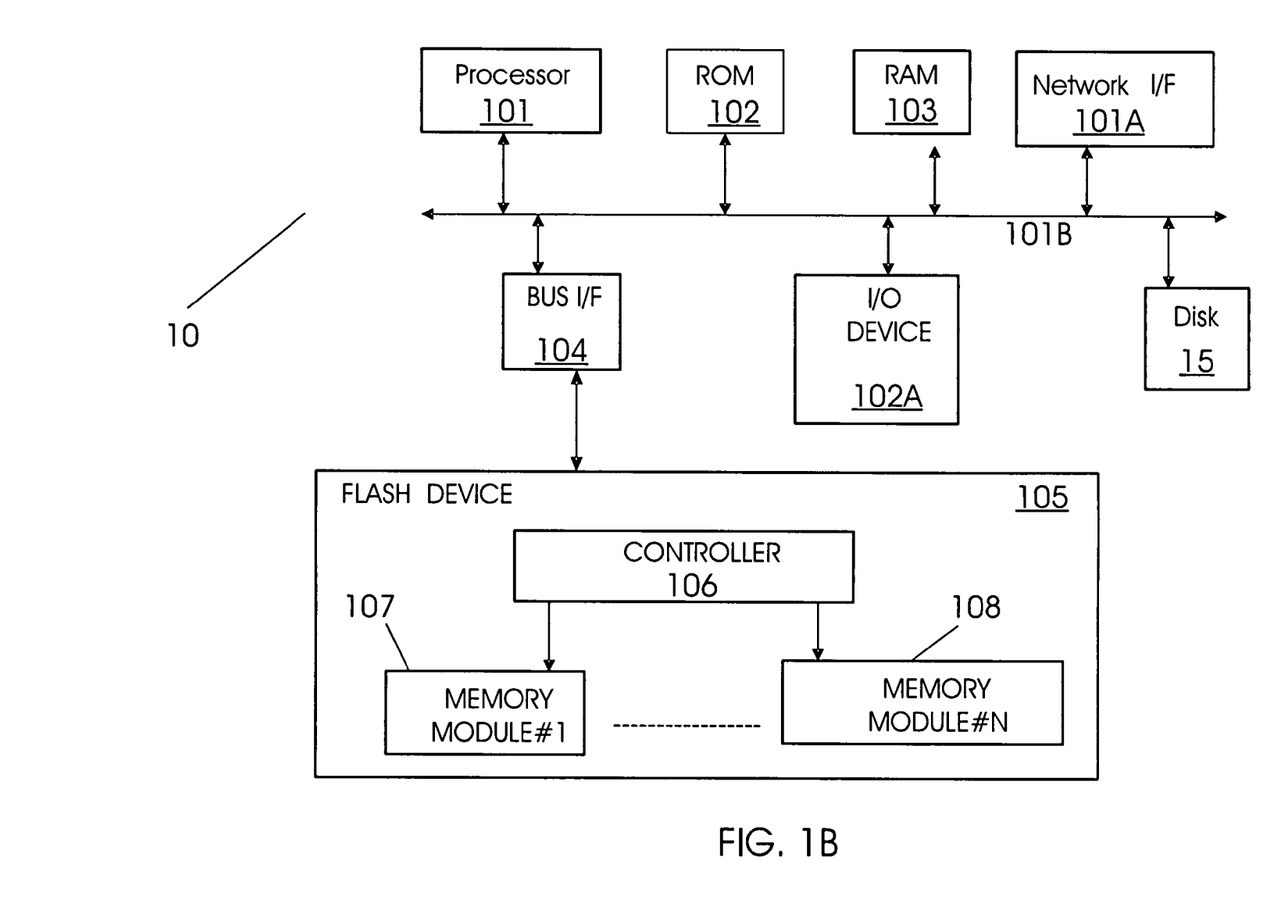
FIG. 1B shows a block diagram of the internal architecture of the computing system in FIG. 1A

FIG. 1B shows a block diagram of a typical host system 10 that includes a central processing unit ("CPU") (or microprocessor) 101 connected to a system bus 101B. Random access main memory ("RAM") 103 is coupled to system bus 101B and provides CPU 101 with access to memory storage. When executing program instructions, CPU 101 stores those process steps in RAM 103 and executes the stored process steps out of RAM 103.

Host system 10 connects to a computer network (not shown) via network interface 101A (and through network connection 12). One such network is the Internet that allows host system 10 to download applications, code, documents and others electronic information.

Read only memory ("ROM") 102 is provided to store invariant instruction sequences such as start-up instruction sequences or basic Input/output operating system (BIOS) sequences.

Input/Output ("I/O") devices 102A, for example, a keyboard, a pointing device ("mouse"), a monitor, a modem and the like are also provided, an example of which is shown in FIG. 1A.

Host system 10 is coupled to a flash memory device 105 that includes a controller module 106 (may also be referred to as "memory controller" or "controller") and solid-state memory modules 107-108 (shown as Memory Module #1 and Memory Module #N). Controller module 106 interfaces with host system 10 via a bus interface 104 or directly via system bus 101B or another peripheral bus (not shown).

There are currently many different flash memory cards that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications (for example, The Universal Serial Bus (USB) specification based interface, incorporated herein by reference in its entirety), the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle (for example, 16, FIG. 1A) for one or more types of memory cards or flash drives but some require adapters into which a memory card is plugged.

A NAND architecture of the memory cell arrays 107-108 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 1C:
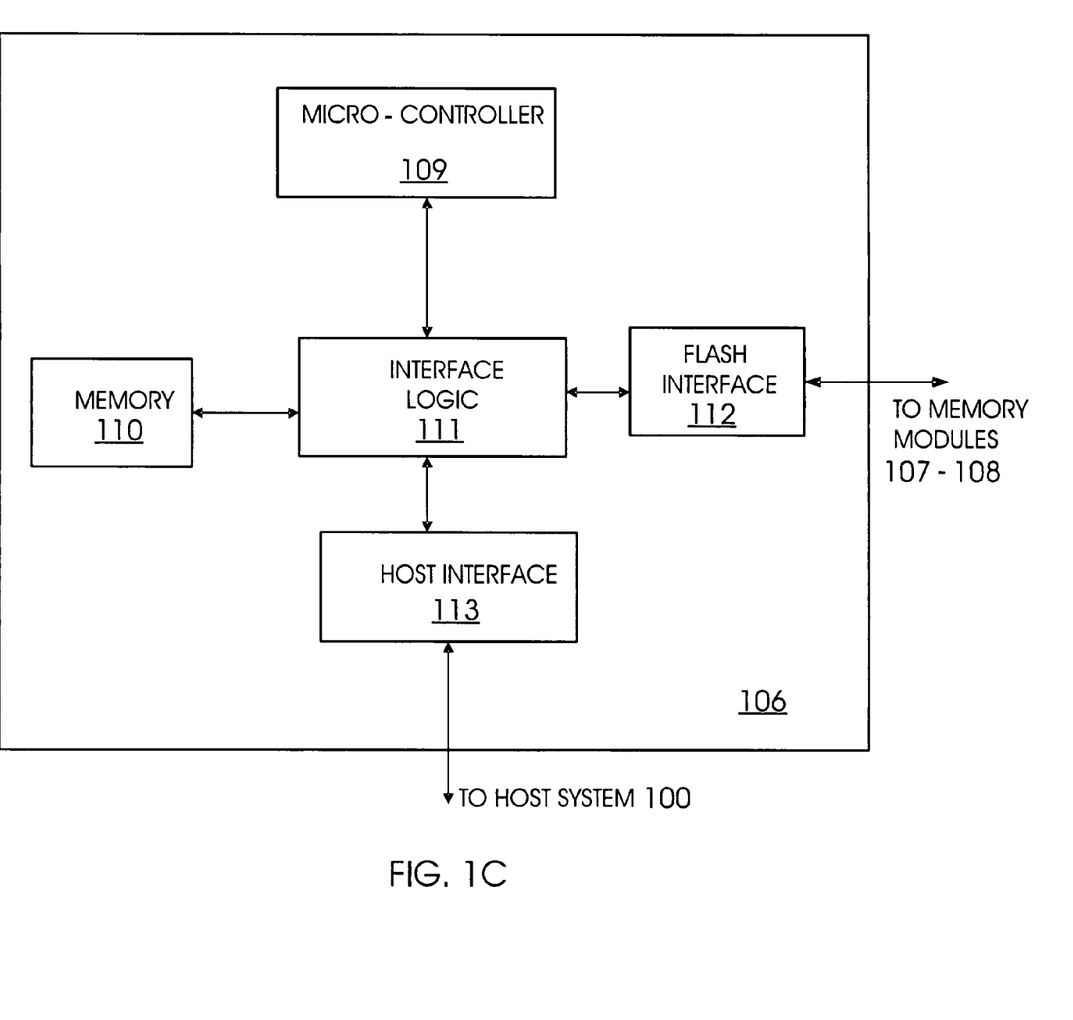
FIG. 1C shows a block diagram of a memory controller in FIG. 1A, according to one aspect of the present invention.

FIG. 1C shows a block diagram of the internal architecture of controller module 106. Controller module 106 includes a microcontroller 109 that interfaces with various other components via interface logic 111. Memory 110 stores firmware and software instructions that are used by microcontroller 109 to control the operation of flash device 105. Memory 110 may be volatile re-programmable random access memory ("RAM"), a non-volatile memory that is not re-programmable ("ROM"), a one-time programmable memory or a re-programmable flash electrically-erasable and programmable read-only memory ("EEPROM").

A host interface 113 interfaces with host system 10, while a flash interface 112 interfaces with memory modules 107-108.

The process steps, according to one aspect of the present invention may be performed using the Internet. The following provides a brief description of the Internet.

The Internet connects plural computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language (XML) as published by W3C Consortium, Version 1, Second Edition, October 2000, ©W3C may also be used. The collection of all such publicly available computer files is known as the World Wide Web (WWW).

The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network or an Internet Service Provider. The web browser may run on any computer connected to the Internet. Currently, various browsers are available of which two prominent browsers are Netscape Navigator and Microsoft Internet Explorer.

The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

It is noteworthy that the present invention is not limited to any particular type of network protocol/standard. Any standard/proprietary network methodology may be used to implement the adaptive aspects of the present invention. For example, the Simple Object Access Protocol (SOAP), an XML based messaging protocol, incorporated herein by reference in its entirety, may be used to implement the adaptive aspects of the present invention.

Advertising System

Figure 1D:
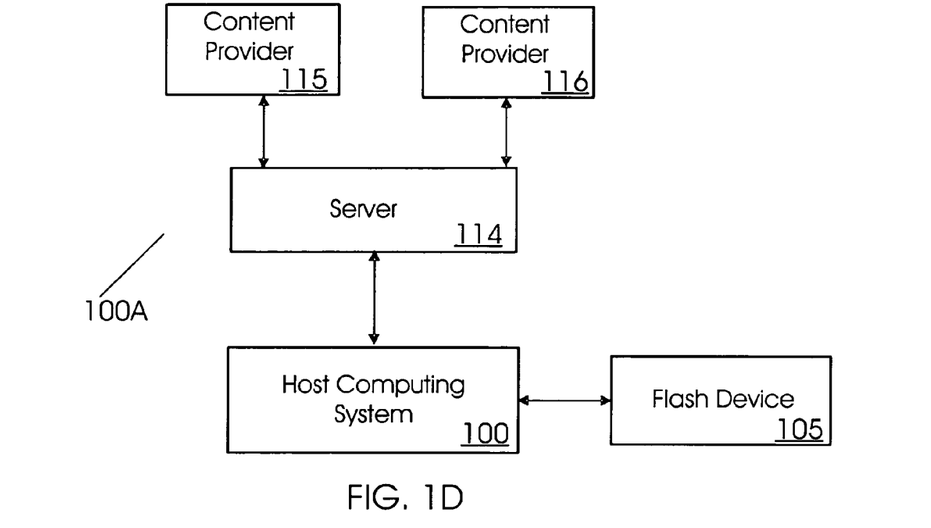
FIG. 1D shows a top-level block diagram of a system, used according to one aspect of the present invention.

FIG. 1D shows a block diagram of a system 100A that allows advertisers to display Ads (including without limitation, video, text, games, applications and any other class of data), according to various aspects of the present invention. System 100A includes computing system 100 that can receive a removable flash device 105. After flash device 105 engages with computing system 100, computing system 100 connects to a server (or remote server) 114, if a network connection is available.

Flash device 105 re-configures the computer screen and opens up a section of the computer screen to allow room for the Ads to be displayed.

Remote server 114 is operationally coupled to plural content provider systems 115 and 116. Content provider systems can be controlled by advertisers or other third parties. Content provider systems 115 and 116 are used to update/download advertising content to server 114 and/or flash device 105.

Server 114 can communicate with flash device 105 securely in various ways. One way to communicate is by establishing a cryptographic connection directly between flash device 105 and server 114, with host 100 serving only to facilitate the communication. Another way is by establishing cryptographic communication between server 114 and host 100, and then establishing communication between host 100 and the flash device 105.

Figure 1E:
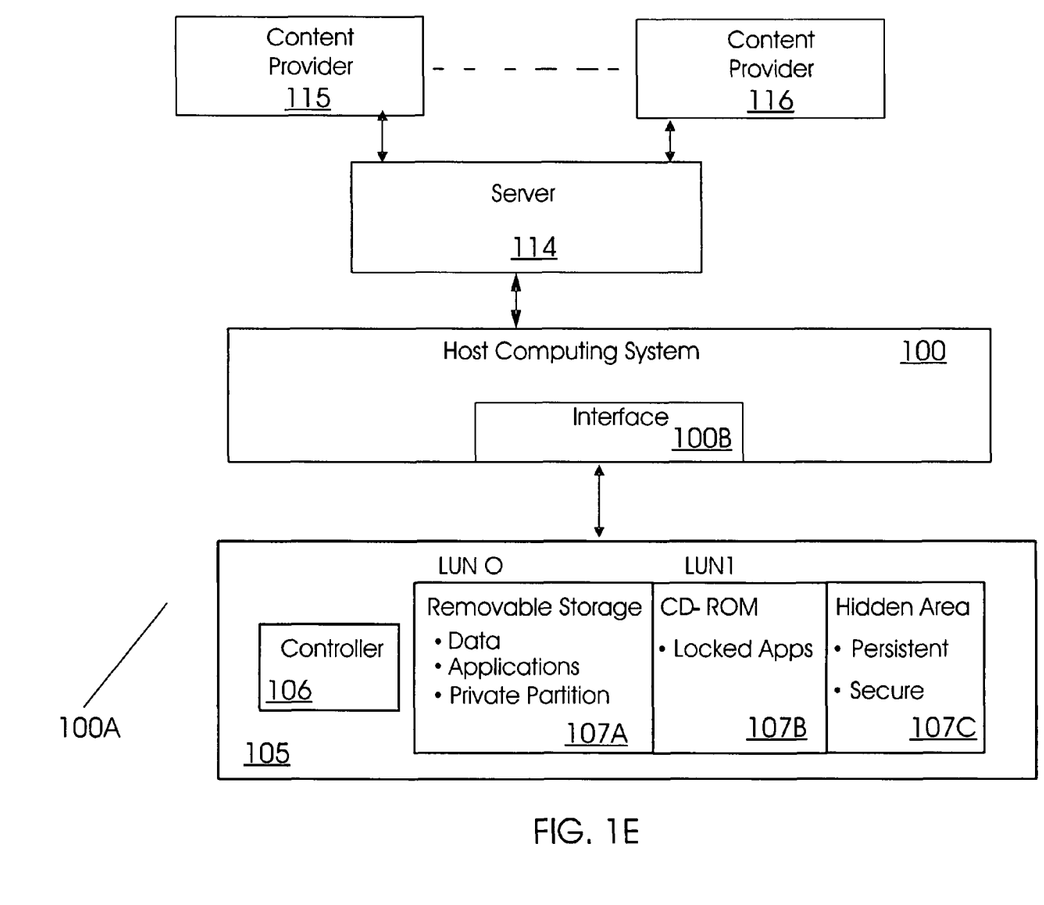
FIG. 1E shows a block diagram where a flash device is a USB device and is used according to one aspect of the present invention.

FIG. IE shows yet another block diagram of system 100A where flash device 105 interfaces with host system 100 via a USB interface. Flash device 105 conforms to the USB specification (i.e. can be accessed via a USB interface) and appears to host 100 having plural Logical Units (LUNs) of storage space and each LUN may appear to be of a different class of storage device. For example, flash device 105 may appear to have both a standard Mass Storage Class volume (LUN 0, 107A), which imitates the behavior of a small computer system interface (SCSI) Hard Disk Drive, and a multimedia card (MMC) Class volume, which imitates the behavior of a CD-ROM (LUN 1, 107B).

Figure 1F:
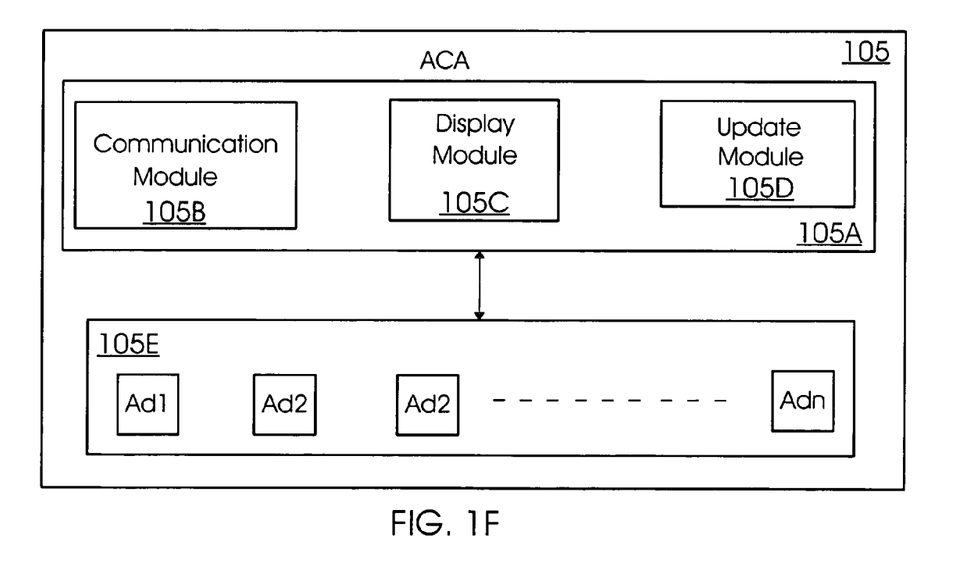
FIG. 1F shows a top-level block diagram of an Advertising Client Application, according to one aspect of the present invention.

Host system 100 having its own operating system views LUN 0 (107A) as a mass storage device for storing data and other information; and LUN 1 107B as a CD-ROM that can store an auto-run application code for launching an application (for example, ACA 105A, FIG. 1F). Hidden area 107C is secured and is not available without proper authentication.

Host system 100 interfaces with flash device 105 via interface 100B. Standard USB based application programming interface (API) may be used for reading or writing data, while proprietary APIs may be used to access hidden area 107C.

FIG. 1F shows a top-level block diagram of ACA (may also be referred to as the Ad system) 105A that is stored and launched from flash device 105 and then executed on computing system 100. In one aspect, the U3 standard specification published by the U3 Consortium facilitates flash device 105 to launch ACA 105A. The U3 specification that is available from the website U3.com is incorporated herein by reference in its entirety.

In one aspect of the present invention, ACA 105A is stored in a secured area (for example, 105E) of flash device 105 and may be encrypted to reduce the risks of hacking (i.e. attempts for unauthorized access to the system).

In one aspect, protected (or secured) area means an area that is read-only, or accessible only by the appropriately authenticated entity—host program, etc. In the case of USB devices with a CD-ROM volume, the program may be stored in the CD-ROM volume (LUN1, 107B, FIG. 1E), which is read-only).

In another aspect of the present invention, memory controller 106 executes and launches ACA 105A when flash device 105 is engaged with computing system 100. ACA 105A is automatically launched when the host system detects the presence of flash device 105. Memory controller 106 may also aid computing system 100A in launching ACA 105A, from flash device 105.

If the host system does not support the auto-launch mechanism, then ACA 105A can be launched manually by the user. ACA 105A can be embedded within a flash device "menu" that allows a user to start programs that are stored in flash device 105. In this case, a user has to launch ACA 105A in order to access flash device 105 storage and/or other functionality.

Figure 1G:
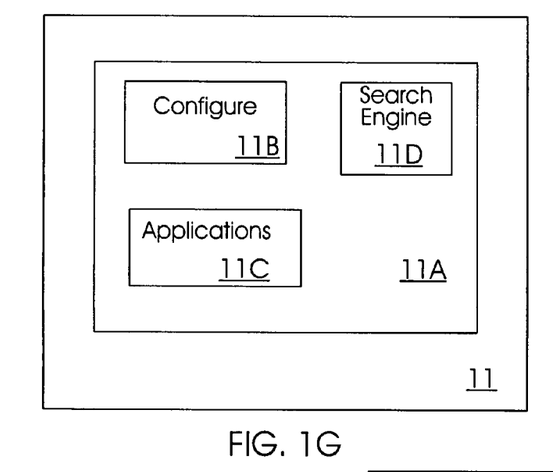
FIG. 1G shows a block diagram of a display device with an advertising window, according to one aspect of the present invention.
Figure 1H:
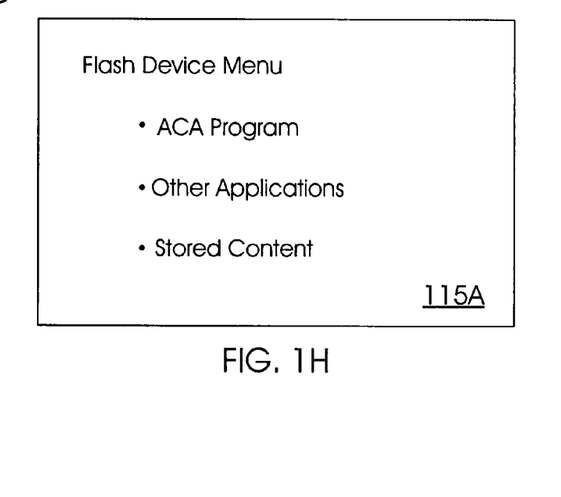
FIG. 1H shows a block diagram of a flash device menu, used according to one aspect of the present invention.

FIG. 1H shows an example of a flash device menu 115A. Menu 115A lists the various items that are accessible in flash device 105. The menu includes ACA program 105A, other applications and stored contents. The actual manner in which ACA 105A is presented may vary based on user choice/preferences.

It is noteworthy, even for manual launch of ACA 105A, the advertiser (content provider 115/116) controls what information and how it is presented to the user. For example, an advertiser can have 2 or more programs that run randomly or in sequence.

Referring back to FIG. 1F, flash device 105 stores advertising content (shown as AD1, AD2 . . . ADn) in segment/area 105E. Ad content can include text, search results, multi-media content, an application or a computer game.

In one aspect, memory area 105E is secured so that access to Ad content is restricted. Access to Ad content is provided to content providers after appropriate authentication only. Ad content can also be encrypted for additional security.

ACA 105A when triggered, launches a window (11A, FIG. 1G). ACA 105A can be triggered when flash device 105 is coupled to host system 100 or as a result of user activity. Window 11A is used to display Ads on a display device connected to computing system 100 (for example, monitor 11). Ads can be displayed real time from server 114 (or if a network connection is not available, then Ads stored in memory area 105E are displayed offline). Window 11A can also be linked to a web server so that content is uploaded/refreshed in real time.

Window 11A is controlled by ACA 105A and not the user. Window 11A is visible to the user according to the policies established by the advertiser. If Ad window 11A stays on top of the user display device and the user maximizes the application, then the application extends to the boundaries of the Ad window 11A and not under. This provides a minimum display area for the Ad content.

Window 11A may also have a portion allocated for certain functions/content so that the overall advertising system is useful for the target audience. For example, window 11A may have an organizer/planner for professionals, games for kids/adults, helpful hints (updated from server 114) (under applications 11C, FIG. 1G), a search engine (11D) or a link to a search engine, or a combination of the foregoing. The user has the ability to customize/configure window 11A so that the various functions/content that are useful to the user are displayed. A configuration icon 11B allows the user to customize window 11A.

In another aspect, the user may be given the option of selecting a set of functionality/content from a menu of choices, arranging, and otherwise customizing the panel.

Referring back to FIG. 1F, ACA 105A comprises of a communication module 105B, a display module 105C and an update module 105D. Communication module 105B facilitates communication between flash device 105 and remote server 114. In one aspect, memory controller 106 can aid in the network connection (12) via network interface 101A.

Communication module 105B periodically communicates with server 114, while flash device 105 is actively connected to computing system 100. In one aspect, such communication is secured to thwart hacking. If flash device 105 detects that ACA 105A is inactive (for example, by using a timeout) for a period, then memory controller 106 firmware can disable the use of flash device 105 or selectively disable certain functionality or otherwise impair device operation, for example, by reducing device performance.

Display module 105C assists in displaying Ads on a display device. Communication module 105B detects a network connection when established with remote server 114. If a remote connection is established, then Ads may be displayed in window 11A in real-time using display module 105C. If a network connection is not available, then display module 105C displays Ads stored in memory area 105E in an off-line mode.

Display module 105C cycles through Ad content stored in memory area 105E and ensures that a consumer is exposed to content for a pre-determined period. This is enabled because the user cannot delete or change window 11A. Exposure may be measured by the amount of time an Ad is viewed by the user, the number of times an Ad is exposed to the user, or by the interaction of the user, for example, by responses to certain questions or interaction/results in a game.

Display module 105C is also enabled to read Internet browsing data (also known as "cookies") from computing system 100 and transfers the cookies to a secured memory area, for example, 105E.

Communication module 105B interfaces with display module 105C and communicates the following to server 114: the amount of time and frequency each content type is exposed to the consumer; the amount of time a consumer had flash device 105 coupled to computing system 100; the type of files, the number of files and size of files that the user was transferring to and from flash device 105; the type of websites the user has visited and the duration of the visit. This information is then made available to content providers who can intelligently target users with relevant content/information.

Advertisers can alter/modify the overall Ad presentation based on user preferences or usage. The modification may be made real time, if computing system 100 is connected to server 114 or offline.

Update module 105D is used to update content stored in memory area 105E. In one aspect, Ad content is updated as a background operation while Ads are being displayed in window 11A. A secured channel (not shown) is used to update Ad content in memory area 105E. Data is stored in secured area 105E and is protected from hacking.

In one aspect of the present invention, the normal functionality of flash device 105, for example, storage capacity, is inhibited, slowed or impaired if ACA 105A is not being actively used. Also, the functionality of flash device 105 is tied to the overall integrity of the ACA system 105A. For example, if the ACA system is tampered with, then flash device 105 stops working. The connection and functionality can be recovered after the ACA system 105A is reinstated.

In one aspect of the present invention, a user is given incremental access to flash device 105 based on how Ads are viewed by the user. For example, suppose that flash device 105 is 2 giga-bytes (GB) in capacity, and window 11A is displayed for 30 seconds as default and the user is given 500 MB as the default capacity to use. When window 11A is displayed, the user is given an option to increase the window display time in exchange for more capacity. For example, a user may choose to view the Ad window for 2 minutes and in return may be given access to additional memory storage space, for example, 100 MB.

The business that hosts/manages server 114 benefits from the ACA system 105A in various ways. For example, the entity can distribute flash device 105 for free or for a nominal fee and charge Ad providers a fee per Ad or a subscription for hosting/providing Ads. In another aspect of the present invention, the advertiser can distribute the flash devices based on their known customer base much like direct mail goes to a target audience.

Different rates may be charged based on the frequency and number of Ads that are viewed. The entity can also obtain a certain percentage of the profit that the Ad providers make by selling goods and services.

The entity can also charge third parties for exposure to advertising material that resulted from a search using search engine 11D or from a search within the USB drive menu 115A. The USB drive menu 115A includes an embedded Ad window and stores applications.

The user can also earn promotional points by viewing Ads through flash device 105. This will enable the Ad provider to develop a relationship with the user.

In one aspect of the present invention, a flash device designer/manufacturer (supplier) (for example, SanDisk Corp.) can host and manage Ad content distribution. The flash device supplier can also sell servers and systems to advertising agencies. The supplier can charge ongoing maintenance fees. The supplier may charge a variable rate depending on the frequency of exposure to Ad content.

In another aspect of the present invention, the supplier (or the entity that hosts the Ad content) can also charge a percentage of the profit/sales price from sale of products/services that are linked to the exposure of the Ad content using the ACA (offline or online).

In yet another aspect of the present invention, an advertising company can provide unique application features along with Ad content to encourage use of the flash device and hence result in more exposure.

In yet another aspect of the present invention, when a user selects or clicks on a link provided in Ad content, then the user is taken to the advertiser's web page or performs some other operation. The entity hosting the Ad content can generate revenue based on such "click through" action.

In another aspect, an advertiser may include all of these advertising features in a product such as a USB drive with a built in MPEG-1 Audio layer 3 (MP3) player. As the user views promotional material then the program will open or unlock the features of the MP3player. As the user uses the MP3player to download music to the player, they would be exposed to the Ads.

Figure 2:
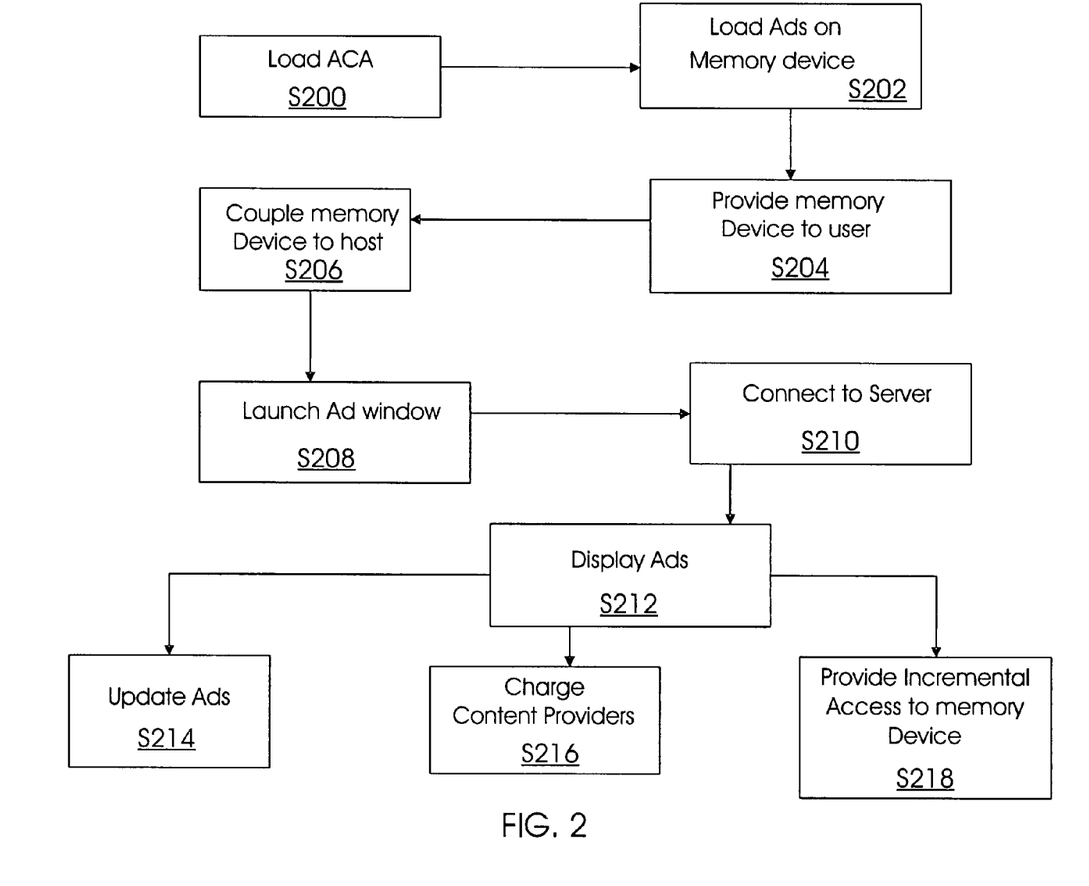
FIG. 2 shows a process flow diagram of displaying an Ad window, according to one aspect of the present invention.

Process Flow:

FIG. 2 shows an overall process flow diagram for providing advertising content to users, according to one aspect of the present invention. Turning in detail to FIG. 2, in step S200, advertising client application (ACA) 105A is loaded on a memory device, for example, flash device 105. ACA 105A may be loaded on flash device by a memory manufacturer or downloaded remotely via a network connection, when a user connects the flash device 105 to a host system, preferably for the first time.

In step S202, after the ACA 105A is loaded, advertising content is loaded on the flash device. In one aspect, a secured memory area is used to store the advertising content so that an unauthorized user is not able to access/modify/delete the stored content. The advertising content can be loaded on the flash device by the flash device manufacturer, the advertising content provider or downloaded using a network connection, when the user attempts to use the flash device.

In step S204, the flash device 105 (with ACA 105A and advertising content) is provided to the user. In one aspect, the flash device 105 is given to the user for free or for a nominal fee.

In another aspect, the user is given the flash device 105 and the user then downloads ACA 105A and the advertising content from server 114.

In step S206, the user operationally couples the flash device 105 with a computing system. Various standard or proprietary receptacles/connectors may be used to couple flash device 105. In one aspect, a USB connector is used to couple flash device 105 to a computing system (for example, 100).

In step S208, ACA 105A launches an Ad window 11A on the computing system display device (for example 11). In one aspect, ACA 105A controls window 11A, i.e., a user cannot close the window. In another aspect, the user is allowed to change certain attributes of window 11A, for example, color, contrast or window boundaries, as long as the window continues to be displayed in the visible area of the display device. Furthermore the user may configure any additional content/functionality on the advertising panel/window 11.

In another aspect of the present invention, Ads are displayed as Pop-Up Ads, when flash device 105 interfaces with host system 105. The Pop-Up window can be generated by using JavaScript or any other means. The Pop-Up window duration and attributes are controlled by ACA 105A.

In step S210, computing system 100/flash device 105 is connected to a remote server (for example, 114). In one aspect, memory controller 106 establishes the network connection using communication module 105B of ACA 105A.

In step S212, server 114 interfaces with the Ad window 11A through ACA 105A and displays content in window 11A. Ad content is streamed real time. Server 114 also examines the Ad content stored in flash device 105.

If the Ad content stored in flash device 105 is not current, then in step S214, server 114 downloads the latest Ad content to flash device 105. In one aspect, access to flash device 105 is secured and requires authentication. Preferably, Ad content is downloaded as a background operation, i.e., while the user is viewing content, server 114 downloads the content to flash device 105. The download allows a user to view Ad content when a network connection is not available, i.e., content is displayed in step S212, without the network connection in step S210.

The entity-hosting server 114 can generate revenue in various ways, as described above. For example, every time content is displayed on a user screen, the content provider is charged a fee (step S216). The content provider may be charged a subscription fee for a certain number or unlimited number of Ads that are displayed. In another aspect, the content provider pays a subscription fee and a fee based on the number of Ads that are displayed in flash device 105.

In another aspect, in step S218, the user is granted incremental access to the flash device 105. The amount of memory is proportional to the number of Ads and/or the duration of the Ads that are displayed on the user screen. For example, the user is given an option to increase the default Ad window 11A exposure time and in return is given access to more storage space.

In one aspect of the present invention, a flash device 105 operates as an advertising application provider. This is beneficial for both the memory manufacturers and the content providers. The user also benefits because it has access to free (or at a nominal fee) storage space.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A removable memory device, comprising:
   a plurality of re-programmable non-volatile memory cells for storing advertisement content; and
   a memory controller interfacing with the plurality of re-programmable non-volatile memory cells;
   wherein an application stored at the removable memory device is launched from the removable memory device and executed on a host system when the removable memory device interfaces with the host system, and the application launches a display window on a display device; and
   wherein the display window is controlled by the application instead of a user using the host system and the application controlled display window is used to display the advertisement content that is stored at the plurality of re-programmable non-volatile memory cells or stored at a server that is accessible by the host system via a network connection, wherein a memory device functionality as available to the user is reduced when the application is inactive for a certain period.

* * * * *